(12) United States Patent
Wolff

(10) Patent No.: US 9,297,483 B2
(45) Date of Patent: Mar. 29, 2016

(54) THREADED INLINE SWIVEL

(71) Applicant: Brian P. Wolff, Raytown, MO (US)

(72) Inventor: Brian P. Wolff, Raytown, MO (US)

(73) Assignee: Husky Corporation, Pacific, MO (US)

( * ) Notice: Subject to any disclaimer, the term of this patent is extended or adjusted under 35 U.S.C. 154(b) by 225 days.

(21) Appl. No.: 13/998,829

(22) Filed: Dec. 12, 2013

(65) Prior Publication Data

US 2014/0138946 A1    May 22, 2014

Related U.S. Application Data

(63) Continuation of application No. 13/199,245, filed on Aug. 24, 2011, now abandoned.

(60) Provisional application No. 61/403,088, filed on Sep. 13, 2010.

(51) Int. Cl.

| | |
|---|---|
| *F16L 21/04* | (2006.01) |
| *F16L 15/00* | (2006.01) |
| *F16L 27/08* | (2006.01) |
| *F16L 33/207* | (2006.01) |
| *B67D 7/32* | (2010.01) |
| *F16L 27/00* | (2006.01) |

(52) U.S. Cl.
CPC .............. *F16L 21/04* (2013.01); *B67D 7/3209* (2013.01); *F16L 15/00* (2013.01); *F16L 27/00* (2013.01); *F16L 27/0828* (2013.01); *F16L 33/2071* (2013.01)

(58) Field of Classification Search
USPC ................. 285/276, 414, 121.5, 121.6, 148.8
See application file for complete search history.

(56) References Cited

U.S. PATENT DOCUMENTS

| | | | |
|---|---|---|---|
| 2,580,626 A * | 1/1952 | Warren | ................. F16L 27/082 285/148.4 |
| 2,698,192 A | 12/1954 | Bily | |
| 3,055,682 A | 9/1962 | Becher et al. | |
| D268,612 S | 4/1983 | Sutcliffe | |
| 4,448,447 A | 5/1984 | Funk et al. | |
| 4,615,547 A | 10/1986 | Sutcliffe et al. | |
| 4,776,615 A * | 10/1988 | Young | ...................... B67D 7/54 141/290 |
| 4,828,183 A * | 5/1989 | Fink, Jr. | ................. B05B 1/3013 137/68.15 |
| 4,863,202 A | 9/1989 | Oldford | |
| 5,340,168 A | 8/1994 | Barker | |
| 5,547,233 A | 8/1996 | Hoegger | |
| 5,609,174 A | 3/1997 | Ferguson | |
| 5,816,624 A | 10/1998 | Smith | |

(Continued)

FOREIGN PATENT DOCUMENTS

| | | |
|---|---|---|
| CA | 2353660 | 3/2008 |
| JP | 403163292 A | 7/1991 |

*Primary Examiner* — Aaron Dunwoody
(74) *Attorney, Agent, or Firm* — Paul M. Denk

(57) ABSTRACT

A threaded inline swivel has a first nut and an opposite second nut each having the form of a generally hollow cylinder with an open end to receive fuel. Each nut has a collar that has a common nominal diameter. A collar provides at least two faces for gripping by a wrench. Each nut has threading for connection to a hose or other fitting. To further seal the swivel to a hose or a fitting, at least one O-ring and at least one gasket are provided as alternative embodiments. In a further alternate embodiment, the swivel has a threaded second nut and an opposite barbed end on the first nut with a clip. The first nut has its chamber that constricts in diameter through a throat as it enters the second nut. The swivel in all embodiments provides for flow of fluid through it with little turbulence.

7 Claims, 11 Drawing Sheets

(56) References Cited

U.S. PATENT DOCUMENTS

| | | |
|---|---|---|
| 6,550,817 B1 | 4/2003 | Mitchell |
| 7,025,391 B2 | 4/2006 | Shu |
| 7,267,374 B2 | 9/2007 | Nielson |
| 8,146,954 B2 | 4/2012 | Su |
| 8,578,957 B2 * | 11/2013 | Wolff .................. F16L 55/1007 137/614.04 |
| 2004/0041395 A1 | 3/2004 | Frost |
| 2005/0275220 A1 | 12/2005 | Shu |
| 2008/0111370 A1 | 5/2008 | Shu |
| 2012/0037245 A1 | 2/2012 | Eley et al. |

* cited by examiner

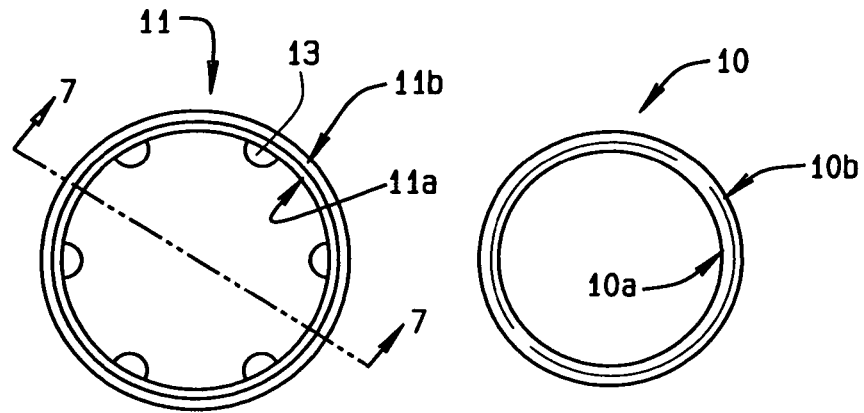
FIG. 6
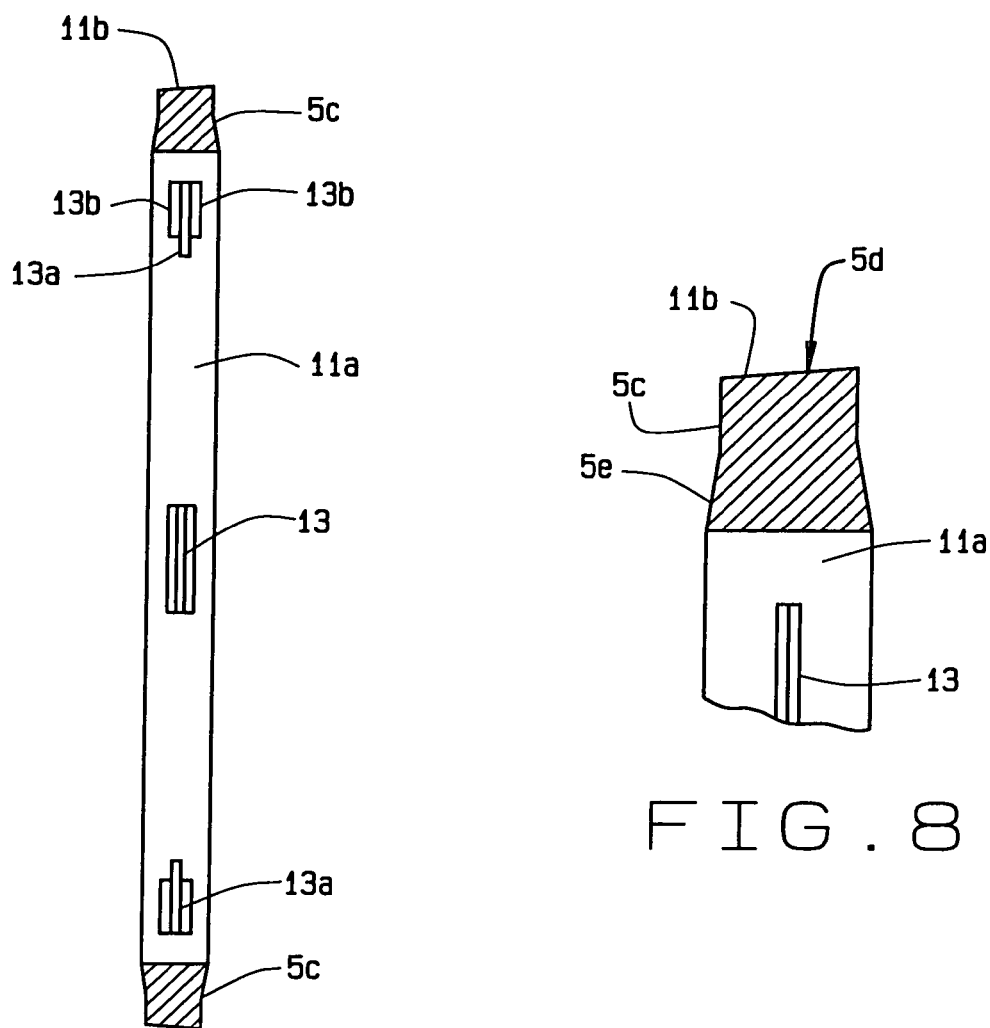
FIG. 7
FIG. 8

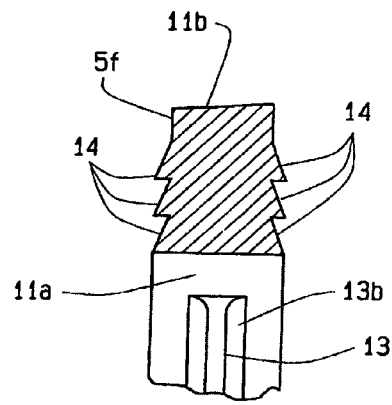
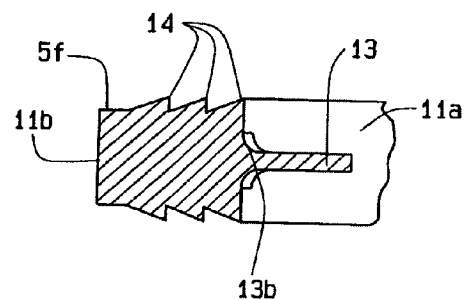
FIG. 8A            FIG. 8B
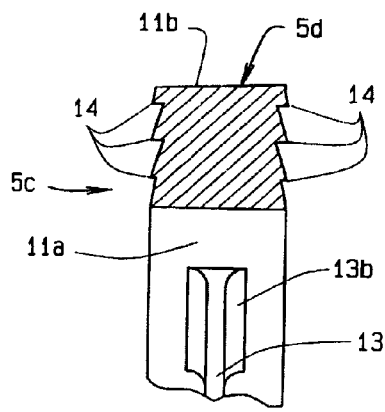
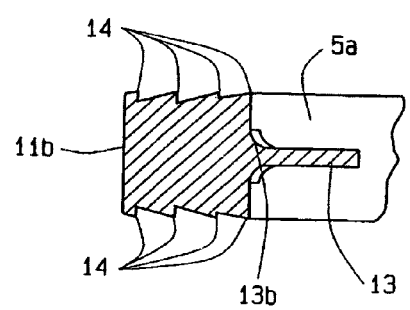
FIG. 8C            FIG. 8D

THREADED INLINE SWIVEL

CROSS REFERENCE TO RELATED APPLICATION

This continuation patent application claims priority to the non-provisional patent application having Ser. No. 13/199,245, filed on Aug. 24, 2011, which claims priority to the provisional patent application having Ser. No. 61/403,088, filed on Sep. 13, 2010.

BACKGROUND OF THE INVENTION

This threaded inline swivel relates in general to means for connecting coaxial hoses, fittings, and nozzles used by motorists for fuel dispensing at a service station, and more specifically to improvements within the swivel allowing for concentric rotation of hoses, nozzles, and fittings connected thereto without leakage of fuel therefrom. A unique aspect of the present swivel is a male nut that constricts its inner diameter so that it fits within a female nut with reduced disruption to fuel flow. This invention is especially useful when applied in a fuel line at its connection to a nozzle where the nozzle may turn axially relative to the hose.

Upon arriving at a pump of a service station, a motorist views a nozzle connected to a length of hose, and the hose connected to the pump. The lengths of hose, fittings, and nozzles require connection among themselves and to service station pumping facilities. Hoses extend from fixed and rigid piping extending from the pump, generally concealed from a motorist. The hoses may extend from the side of the pump, approximately midway on its height or from overhead of the pump, descending to the typical usage height of a motorist. Hoses, manufactured to specific lengths, generally extend continuously from the pump to the nozzle. However, hoses, fittings, and nozzles interconnect in a generally linear path for conveying fuel from the pump to the motorist's fuel tank. At a service station, the nozzle enters the motorist's fuel tank at one angle while the hose extends from the pump at a different angle. Though hoses and select fittings can twist to a degree and accommodate the difference in angles, in time hoses wear from such twisting. Where a hose connects to a rigid fitting, the fitting may not tolerate such a change in angles through the hose to it.

Further, numerous swivels in the prior art furnish rotation between connected hoses and fittings, and more particularly, such swivels normally see use in lines containing fuel. Generally swivels have use in those situations where the fuel line leads from a fuel dispenser to a nozzle.

Swivels also encounter forces imposed upon them by the service station environment, often errant motorists. Swivels may endure unbalanced internal forces as in a nuisance break or drive off. In such a nuisance break, greater fluid forces are exerted in one direction upon one part of the swivel than upon the other. When spontaneous and unbalanced high pressures are encountered, the pressure exerted upon one component of the swivel in one direction, substantially differs from the fluid pressure that may be exerted upon the other components of the swivel, and therefore, this pressure disparity tends to increase the risk of premature separation or failure of a swivel, in an untimely and dangerous fashion. This can and has occurred particularly where the fluid pressure in the hose may undergo a phenomenon that is equivalent to "water hammer."

The lengths of hose, fittings, and nozzles require connection among themselves and to service station pumping facilities. Hoses, fittings, and nozzles have swivels, often near the pump, that rotate when an errant motorist drives away with a hose in a vehicle, and thus prevent a spill or worse a fiery catastrophe. Until such an event, a swivel joins two sections of a fueling line or fittings and permits passage of fuel therethrough. As fuel pumps through the flow line, pressure spikes significantly and substantially throughout the hose, momentarily, and even at the location of a swivel, as when the flow is suddenly stopped, as for example, by the automatic shutoff by a nozzle when the fuel tank is full. Hence, leakage at such couplers has frequently occurred in the field, and on occasion, as previously explained, untimely separation or damage of the swivel has happened.

Also, where a hose connects to a nozzle or to a fitting, a swivel joins the two adjacent components for continuous flow there through while allowing for coaxial rotation.

DESCRIPTION OF THE PRIOR ART

Other patents that show various related swivels include the Pat. No. Des. 268,612 to Sutcliffe disclosing a swivel connector for hoses. This connector shows a threaded male end rotatably connected to a female end. The axis of rotation for this connector is generally perpendicular to the direction of flow through it. The male end rotates at an angle to the female end, similar to an elbow bending, so that connected hoses also bend.

Another swivel connector appears in U.S. Pat. No. 4,615,547 to Sutcliffe and Fink. This connector has a pair of swivel connectors joined upon a common boss. One swivel rotates upon an axis generally perpendicular to the flow direction. Each connector has a male end with a threaded swivel nut thereon and an opposite female end with a thread fitting engaged therein. Each swivel alters the flow path through an approximate ninety degree bend and offsets the flow approximately one half of the diameter of the female end. The male end also rotates at an angle to the female end much like a bending elbow, so that hoses connected thereto also bend. In bending similar to a hinge, the swivels cause hoses, fittings, and nozzles to attain a non-linear flow path that may affect fuel flow. The hinge like bending also causes the connected parts to occupy slightly more space in the compact service station environment.

The present invention overcomes the limitations of the prior art. Where, the present invention, a threaded inline swivel, uses coaxial male and female nuts that mutually rotate upon an axis parallel to the length of the swivel and the direction of flow.

SUMMARY OF THE INVENTION

A threaded inline swivel begins with a male nut and an opposite female nut each having the form of a generally hollow cylinder with an open end to receive and to dispense fuel. The male nut and the female nut each have a collar that has a common diameter. Each collar provides at least two faces for gripping of the adaptor by a wrench or other tool. The male nut and the female nut each have threading for connection to a hose or other fitting. Within the interior of the swivel, the two ends of the male nut and the female nut open into a smooth walled chamber that allows for uninterrupted fluid flow. To further seal the connection of the swivel to a hose or a fitting, at least one O-ring and at least one gasket are provided as alternative embodiments. In a further alternate embodiment, the swivel has a threaded female nut and an opposite barbed end on the male nut with a clamp. The male nut has its chamber that constricts in diameter through a throat as it enters the female nut. The swivel in all embodiments provides for flow of fluid through it with few if any turbulent effects.

Generally, the threaded ends of the nuts simply turn into cooperating female threaded hoses and fittings. A user places a tool upon the collar thus gripping the male nut, the female nut, or both for installation of a second hose or fitting at low labor and equipment cost. Cooperating races upon the male nut and the female nut and various size bearings keep the nuts connected but allow for coaxial rotation parallel to the length of the swivel and fluid flow. Strategically located O-rings provide for fluidic sealing of the swivel to various hoses and fittings in the flow line from a fuel pump. The present invention does not require the use of any strong biasing springs, or other mechanisms, to provide for its quick and simple installation.

Therefore, it is an object of the invention to provide a new and improved threaded inline swivel for fuel nozzles, fittings, hoses, and lines.

It is a further object of the present invention to connect two fluid transmitting items generally coaxially for minimal turbulent flow.

It is a further object of the present invention to provide a threaded inline swivel that allows for grasping by a tool upon its center.

It is a further object of the present invention to dissipate any abrupt pressure spikes generated within the threaded inline swivel during its functioning within a flow line thus preventing undesirable fuel leakage or untimely separation of hoses and fittings.

Another object of this invention is to provide a threaded inline swivel where it's sealing O-rings and gaskets are normally located within seats and cooperating with threads respectively during normal and routine usage of the adaptor when installed within a fluid flow line.

Another object is to provide such a threaded inline swivel capable of connecting to a variety of hoses and fittings having female ends, threaded and unthreaded.

Another object is to provide such a threaded inline swivel that has a low cost of manufacturing so the purchasing people and organizations can readily buy the adaptor through stores and supply sources.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings,

FIG. 6 describes a top view of the O ring and gasket for the alternate embodiments of the present invention;

FIG. 7 shows a sectional view of the gasket;

FIG. 8 shows a detailed view of the edge of the perimeter of the gasket;

FIG. 8a provides a detailed view of an alternate embodiment of the edge of the perimeter of the gasket;

FIG. 8b provides a detailed view of an alternate embodiment of the edge of the perimeter of the gasket;

FIG. 8c provides a detailed view of an alternate embodiment of the edge of the perimeter of the gasket;

FIG. 8d provides a detailed view of an alternate embodiment of the edge of the perimeter of the gasket;

The same reference numerals refer to the same parts throughout the various figures.

DESCRIPTION OF THE PREFERRED EMBODIMENT

Figure 1:
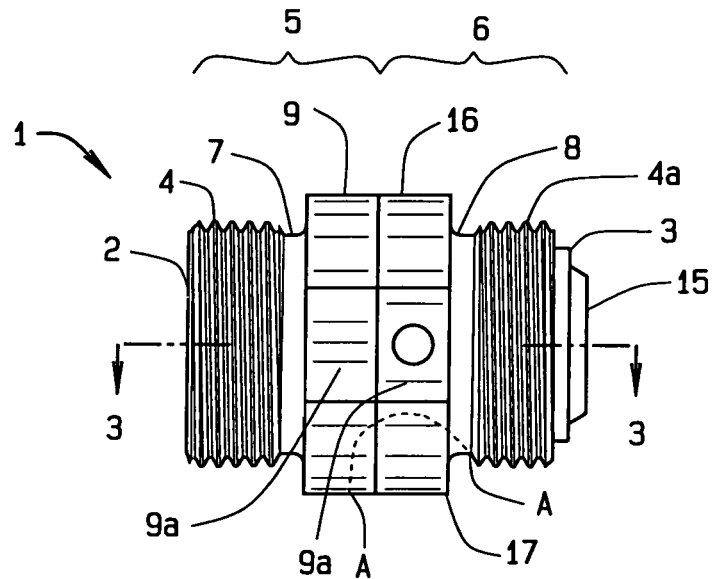
FIG. 1 shows a side view of the swivel of the present invention.

The present art overcomes the prior art limitations of various swivels by providing a swivel that allows for coaxial rotation of two halves and includes a tapered throat to minimize adverse fluid flow effects. The present invention 1 appears in FIG. 1, and has a generally hollow cylindrical form with a first end 2 and an opposite second end 3. As shown both ends 2, 3, have external threads 4 and 4a, respectively, here shown as right hand, coarse. The threads continued for approximately four revolutions around the circumference of the ends. The threads extend inwardly upon a first nut 5 and an opposite second nut 6. The first nut and the second nut are hollow and have sufficient length for a solid connection of the swivel to a hose or other fitting. The second nut also has a tip 15 here shown slightly extending from the threads of the second end towards the right of the figure. The tip will be further shown in FIGS. 3, 5. Inwardly, each nut has a notch upon its perimeter, a first notch 7 at the end of the threads 4 on the is first nut 5, and a second notch 8 opposite the first notch where the threads 4a end on the second nut 6. The notches 7, 8 have a lesser diameter than the threads 4, 4a and the ends 2, 3. Defining one side of each notch and opposite the threads, each nut has a collar. The first nut has a first collar 9 of a diameter noticeably greater than diameter of the threads. The collar has a thickness, along the length of the swivel, suitable for gripping by a tool, such as a wrench or channel lock pliers. The collar extends around the circumference of the swivel, that is, perpendicular to the length of the swivel. The collar is generally round but for at least two faces 9a. The second nut has a second collar 16 also of a diameter noticeably greater than diameter of the threads and generally the same diameter as the first collar for overall smoothness of the swivel. This collar also has a thickness, and faces 9a suitable for gripping by a tool, such as a wrench or channel lock pliers. The second collar also includes a cap 17 generally centered in one face 9a. The cap covers the aperture in the second collar for admission of bearings as later shown in FIG. 2. As an alternate embodiment, the adaptor includes at least one O-ring 10 and at least one gasket 11. The O-ring has a generally O shape as later shown in FIG. 6 and a rounded cross section. The gasket also has a generally rounded shape as shown later in FIG. 6 but with a squared cross section.

Figure 2:
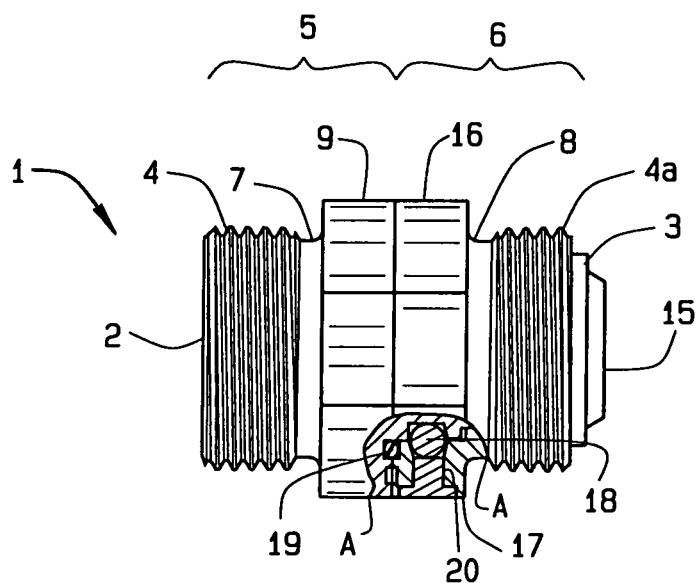
FIG. 2 shows a partial cut away view of the swivel.

Turning the swivel axially one quarter turn downward from FIG. 1, FIG. 2 shows the swivel 1 with the faces 9a downwardly and the cap at the lowest to portion of the swivel. This figure shows a partial section through the collars 9, 16, more and so on the second collar 16 along line A-A. Inwardly from the cap, the second collar has an aperture 20 into which fits the cap 17 and a first bearing 18. The first bearing remains sandwiched between the collar and a portion of the first nut as later shown in FIG. 3. To the left of the bearing in the figure, the first nut is includes a first O ring 19. The first O ring 19 occupies the corner formed from the inner edge of the second nut and the inside corner of the first nut, also as later shown in FIG. 3. With the cap in place, the first bearing remains in place. With the cap removed, the first bearings can exit the second nut or alternatively be installed into the second nut.

Figure 3:
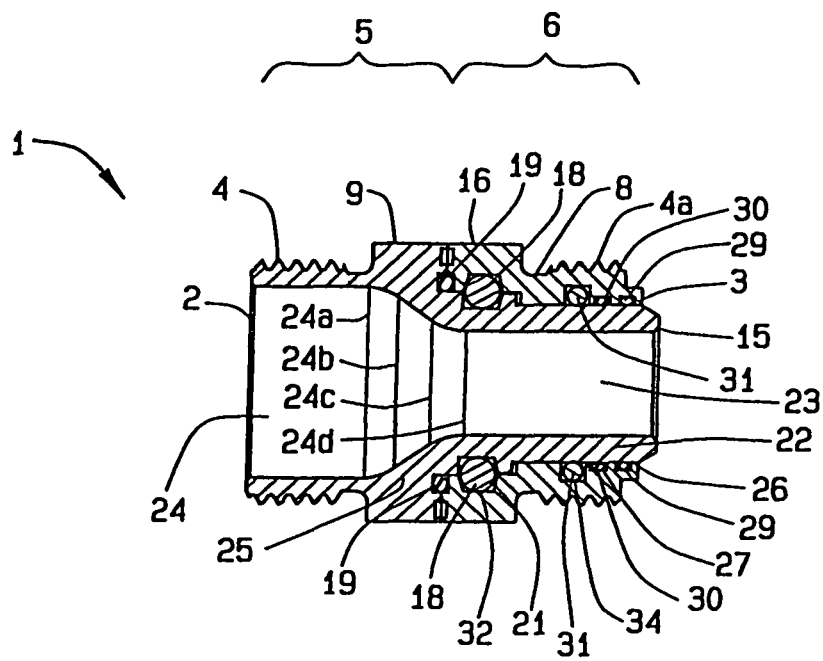
FIG. 3 shows a sectional view of the swivel with fluid flow to the right.

FIG. 3 provides a longitudinal section view through the swivel with the first nut connected to the second nut. As above, the first nut 5 has an open end 2 that has external threads 4. Inward of the threads, the first nut has the first notch 7 and then the collar 9. Forward of the collar, the first nut has its neck 22 that fits within the length of the second nut. The neck generally has a slightly lesser diameter than the inner diameter of the second nut. The neck also has a noticeably lesser diameter than the end 2. Opposite the collar 9, the neck has the tip 15, here shown with a slight bevel to ease assembly. The neck is also a generally hollow cylinder forming a chamber 23 through which fuel flows. The chamber has a narrow diameter within the neck and then a wider diameter proximate the end 2. The chamber has a throat 24 having the widest diameter of the chamber and locating inwardly from the end 2 to approximately where the collar adjoins the first notch. The widest diameter is shown as line 24a. Inward of the widest diameter, the throat curves in a slightly concave manner for a short distance to the second widest diameter, line 24b. From that line, the throat has its diameter decrease in a linear manner going forward to the neck to line 24c, the third widest diameter. Inward of the third diameter, the throat curves in a slightly convex manner for a short distance to attain the inner diameter of the neck as at line 24d. The transition in chamber diameter from the throat 24 to the neck 22 occurs over a portion of the first nut call the constriction 25. The constriction reduces the diameter of the throat by approximately 40% as it transitions to the diameter of the neck. The constriction, being hollow and round like the throat and the neck allows for the passage of fuel through it at the least amount of adverse fluid flow effects. Outwardly from the constriction towards the neck, the neck includes a race 21 of a suitable width to admit the first bearings 18.

And as above, the second nut 6 has its second end 3 here shown to the right, proximate the emplaced tip 15. The second end is generally hollow for admission of the neck therein. The second end has its external threads 4a, the second notch 8, and the second collar 16. Within the second nut, the second end has a second race 26, a third race 27, and a fourth race 34 mutually spaced apart and concentric. The second race and the third race extend outwardly into is the end to admit the second O-ring 29 and the third O-ring 30. The second and third O-rings have an inner diameter slightly smaller than the outer diameter of the neck for a snug fit, preventing fuel leakage. Away from the end and generally inside of the threads, the second nut has the fourth race 34 that extends outwardly into the nut more than the second and third races. The fourth race admits the second bearings 31 that contact the surface of the neck, allowing rotation of the neck of the first nut relative to the second nut. Then within the collar 16, the second nut also has the fifth race 32 that admits the first bearings 18, once more for rotation of the two components of the invention. Generally, the first bearing 18 has a larger diameter than the second bearing 31. And outwardly from the fifth race, the second collar and the first collar, outwardly from the line 24c, have the first O ring 19 locating between the two collars.

Figure 4:
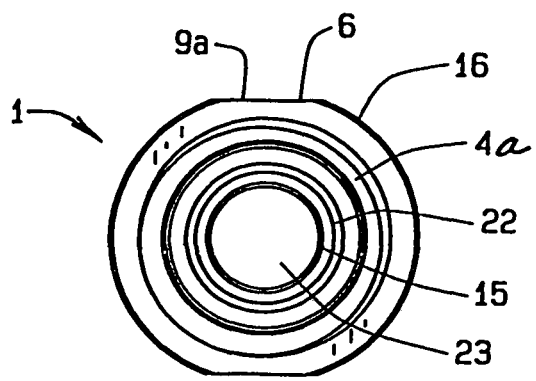
FIG. 4 describes an end view of the swivel.

This embodiment of the inline swivel has a generally round shape when viewed on end in FIG. 4. The inline swivel 1 has its second nut 6 with the second collar 16 that generally defines the maximum diameter, that is, width of the swivel as seen by the motorists after its installation. The collar, generally round, has two spaced apart and mutually parallel faces 9a. The faces allow for a tool, such as a wrench or channel lock pliers, to grip the second nut 6 of the inline swivel. The tool then either turns the second nut into a hose or fitting, or holds the second nut to steady as a hose or fitting turns upon either stem. Stepped inwardly from the collar's diameter, the second nut has its threads, as at 4a, here shown in an end view of the end itself 3. In the center foreground of the figure within the end, the neck 22 extends outwardly from the end, that is, out of the plane of the figure. The tip is generally beveled, as previously shown in FIG. 3. Within the tip, the neck has the chamber 23 through which fuel flows from the first nut through the second nut.

Figure 5:
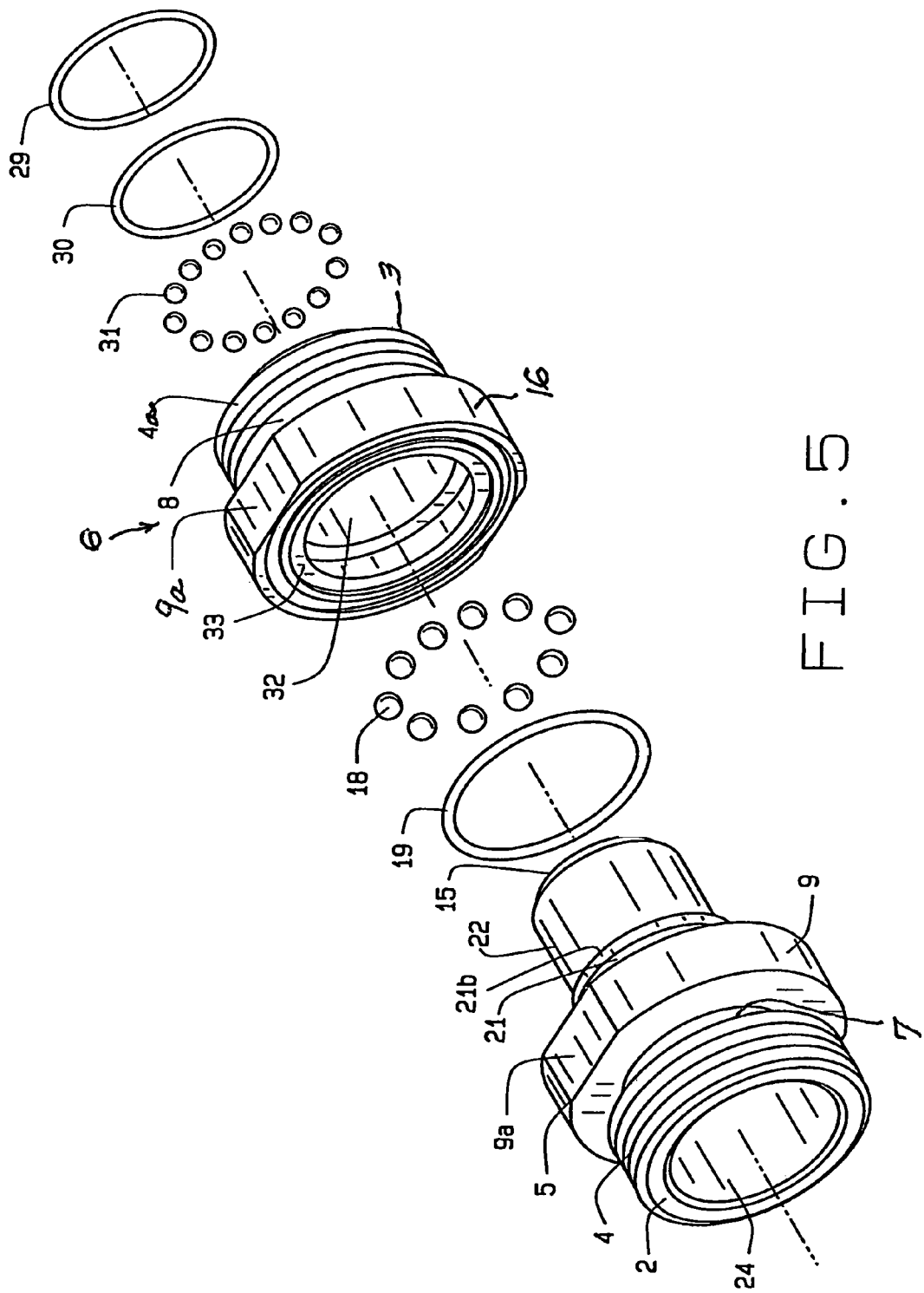
FIG. 5 shows an exploded view of the two fittings of the swivel.

FIG. 5 then shows the inline swivel 1 in an exploded view of the first nut 5 and the second nut 6. The first nut 5 begins with its throat 24 leading into the nut from the end 2. The end has threads 4 for connection to a hose, fitting, or nozzle. The threads continue inwardly to the first notch 7. The threads generally maintain a constant outer diameter for the end while the throat has its constant inner diameter through the threaded portion of the end up to line 24a within the first notch as previously shown. Inwardly from the first notch, the first nut 5 expands in width at the first collar 9. The collar 9 is generally round except for the two flat, mutually parallel faces 9a suitable for a tool. The collar has a greater diameter than the threads 4 and generally establishes the maximum width of the swivel. Opposite the threads, the neck 22 extends from the collar further inwardly of the invention. The neck is generally a hollow cylinder of lesser diameter than the threaded end 2. Proximate the collar, the neck has the race 21 that receives the bearings 18. The race has a slight recess into the diameter of the neck, previously shown in FIG. 3, and fits between first step 21a, not shown in this view, and second step 21b. The first step and the second step are mutually spaced apart bands having a thickness and a diameter greater than that of the neck. The first step and the second step extend around the circumference of the neck and each has a generally square like cross section. The spacing between the first step and the second steps is generally that of the diameter of the first bearings 18. Both the first step and the second step have a position proximate the collar 9 and removed from the tip 15. Inwardly from the race 21, the neck extends to its maximum length shown at the tip 15. The tip has a beveled surface at the terminus of the first nut 5 opposite the end 2. Outwardly from the first nut, the swivel has the first O-ring 19 with an inner diameter that fits snugly upon the first step contiguous with the collar. The first O-ring has a generally round shape and a round cross section. Then outwardly from the first O-ring, the swivel includes a set of first bearings 18, approximately 0.125 inch to approximately 0.3 inch in diameter, preferably 0.1875 inch in diameter. Though this figure shows ten first bearings, the preferred embodiment includes fifteen first bearings generally positioned within the race 21, as previously shown in FIG. 3.

Outwardly from the first bearings 18, the swivel has the second nut 6 with its second collar 16. The second collar has a generally round shape except for two flat faces 9a. Centered within the second collar, a round aperture 32 has a diameter similar to that of the first step 21a. The aperture's diameter admits the neck 22 into the second nut. Inwardly from the aperture, the second collar has a third step 33 that increases the thickness of the second nut proximate the threads. The third step has an inner diameter similar to the outer diameter of the neck 22 and less than the diameter of the second step 21b. Inwardly from the second step, the second nut continues in a hollow cylindrical manner towards end 3. Proximate the second end 3 and interiorly, the second nut has the fourth race 28, generally of greater diameter than the third step that receives the second bearings 31, and the second race 26 and the third race 27 that receive O-rings 29, 30 as previously shown in FIG. 3. And outwardly from the end 3, the swivel includes second bearings 31, second O-ring 30, and third O-ring 29 shown concentrically. Though the figure shows fourteen bearings, the preferred embodiment includes twenty two second bearings. The second bearings have a diameter of approximately 0.0625 inch to approximately 0.25 inch. The second and third O-rings have an inner diameter similar to the outer diameter of the neck, a round shape, and a generally round cross section.

Generally for closing off the threaded connection of a hose or fitting to the swivel 1 proximate the notches 7, 8, the adaptor provides the gasket 11 and an additional O-ring 10 as shown in FIG. 6. The O-ring 10 is generally round within an inner edge 10a at an inner diameter and an outer edge 10b at an outer diameter greater than the inner diameter. The O-ring has a generally round cross section, radially, between the inner edge and the outer edge. The inner diameter is generally slightly more than the diameter of the adaptor at the notches but less than the diameter of the thread 4. The O-ring has a material that allows for slight stretching for placement over the threads and compression by a hose or other fitting when connected thereto. Alternatively, the swivel has the gasket 11, generally round, with an inner rim 11a at an inner diameter and a rim 11b at the outer diameter of the gasket. The inner diameter of the gasket generally exceeds that of the O-ring 10. The inner rim and rim of the gasket form a generally square cross section as later shown in FIG. 7. Upon the inner rim, the gasket has a plurality of spaced flutes 13. Here the flutes have a generally semi-circular shape extending inwardly into the gasket, towards its nominal center. The radius of each flute begins at the inner rim and turns through 180 degrees of arc. Preferably, the gasket has an even number of flutes, here shown as six. The flutes engage the threads 4, 4a of each nut 5, 6 and allow a user to rotate the gasket to a desired position upon the nut. Either gaskets or O-ring are used, but not both. Alternatively, the gasket has an odd number of flutes to preventing jamming of the gasket during turning upon the threads 4, 4a.

FIG. 7 then shows a cross sectional view of the gasket 11. The gasket has the rim 11b that faces outwardly from the gasket and swivel when installed, and the opposite inner rim 11a upon the interior of the gasket. Perpendicular to the rim and the inner rim, an edge 5c joins the two rims upon both sides of the gasket. The edges and the two rims generally form a square cross section as shown in the top and the bottom of the figure. Upon the inner rim, the gasket has the flutes 13, generally equally spaced. Each flute has a thin tip 13a away from the inner rim than merges with shoulders 13b of greater thickness than the tip. The shoulders join to the inner rim. The flutes and the tips extend inwardly, that is, away from the inner rim.

FIG. 8 then shows the perimeter of the gasket more closely. Though showing a portion of the perimeter in this figure, the structure extends upon the entire perimeter of the gasket. The gasket has the inner rim 11a with a flute 13, rim 11b, and edge 5c as before. The rim though in this embodiment has a slight slope 5d, extending from left to right in the figure. The slope is approximately 1 to 4 degrees and oriented so that the bottom of the slope advances towards the collar upon turning the gasket on a stem. The edge 5c further includes a taper 5e partially along the length of the edge. The taper begins at the thickness of the gasket and then narrows slightly about midway along the edge.

Another form of the edge 5c appears in FIG. 8a with a perimeter sectional view. The gasket begins with a flute 13 upon the inner rim 11a with the opposite, or outwardly, rim 11b as before. The rim has its slope 5d outwardly from the inner rim similar to that shown in FIG. 8. Unlike the smooth edges 5c, this embodiment has three mutually spaced apart barbs 14 here shown in section. The barbs appear as concentric rings upon the edges when seen as in FIG. 6. The barbs, as a group, extend at least midway from the inner rim to the rim. The barbs have their narrowest portion outwardly towards the rim and their thicker portion inwardly towards the inner rim. Outwardly from the barbs 14, the gasket has a tip 5f generally proximate the rim. The tip generally lacks barbs or other securing surface features. FIG. 8b orients the sectional view to a flat orientation as a hose or fitting would abut the gasket. In FIG. 8b though, the rim 11b at the tip 5f is generally square, or without a slope. This figure also shows a partial section of a flute where the tip extends inwardly from the shoulders.

A third form of the edge 5c appears in FIG. 8c, also in a perimeter sectional view. The gasket has its flute extending inward from the inner rim 11a with the opposite, or outwardly, rim 11b as before. The rim has its slope 5d outwardly from the inner rim similar to that shown in FIG. 8. This embodiment also has three mutually spaced apart barbs 14 here shown in section. The barbs appear as concentric rings upon the edges when seen as in FIG. 6. These barbs, as a group, span from the inner rim to the rim. The barbs have their narrowest portion outwardly towards the rim and their thicker portion inwardly towards the inner rim. In this embodiment, the gasket lacks a tip as in the previous embodiments of the edges. FIG. 8d orients the sectional view to a flat orientation as a hose or fitting would abut the gasket. Similar to FIG. 8b, the rim 11b is generally square, or without a slope. The rim also truncates the outer barb on the top and bottom edges. This figure also shows a partial section of a flute where the tip extends inwardly from the shoulders.

Figure 9:
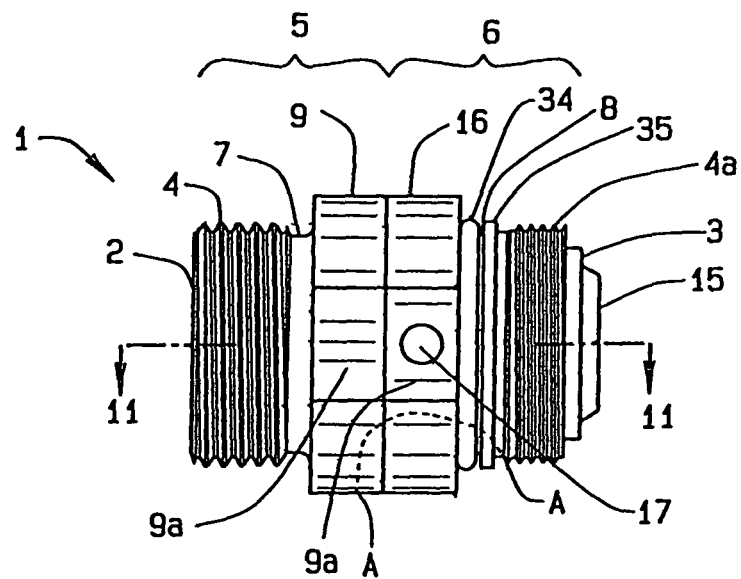
FIG. 9 shows a side view of an alternate embodiment of the swivel.

A second embodiment of the swivel appears in FIG. 9 in a side view. This swivel 1 also has a generally hollow cylindrical form with a first end 2 and an opposite second end 3. As shown both ends 2, 3, have external threads here shown as right hand. The threads continue for approximately five revolutions around the circumference of the ends. The threads extend inwardly upon the first nut 5 and an opposite second nut 6. The first nut and the second nut are hollow and have sufficient length for a solid connection of the swivel to a hose or other fitting. The threads upon the first nut, as at 4, have generally coarse form while the threads upon the second nut, as at 4a, have generally fine form. Outwardly from the threads 4a of the second nut 6, the tip 15 of the neck 22 of the first nut 5 extends.

Inwardly, each nut has a notch, a first notch 7 at the interior ending of the threads 4 on the first nut 5. The second nut 6 also has a flange 35 inwardly of the interior ending of the threads 4a and a second notch 8 inwardly of the flange opposite the first notch where the threads 4a end on the second nut 6. The notches 7, 8 have a lesser diameter than the threads 4, 4a and the ends 2, 3. The second notch 8 receives a fourth O-ring 34 upon its circumference. This O-ring has a generally round shape with a round cross section. This O-ring has an outer diameter similar to the outer diameter of the flange. Centered between the two ends, this embodiment of the swivel also has a collar 9 on the first nut 5 and a second collar 16 on the second nut 6. Each collar has a diameter noticeably greater than diameter of the threads. Each collar has a thickness, along the length of the swivel, suitable for gripping by a wrench or other tool. Each collar extends around the circumference of the swivel, perpendicular to the length of the swivel. The collar is generally round except for two faces 9a later shown in FIG. 9. The second collar 16 also includes the cap 17 upon the aperture 20 for insertion of the first bearings 18 into the invention. As an alternate embodiment, the swivel includes at least one gasket 11 that has a generally rounded shape as previously shown in FIGS. 4, 5 with the variations shown in FIGS. 6-8d.

Figure 10:
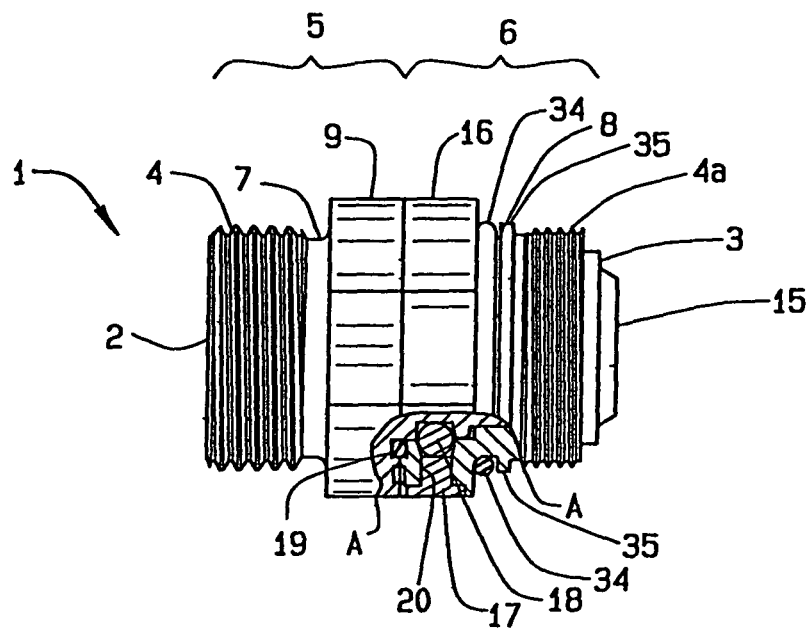
FIG. 10 shows a partial cut away view of an alternate embodiment of the swivel.

Turning the swivel axially one quarter turn downward from FIG. 9, FIG. 10 shows this alternate embodiment of the swivel 1 with the faces 9a downwardly and the cap at the lowest portion of the swivel. This figure shows a partial section through the collars 9, 16, more and so on the second collar 16 along line A-A. Inwardly from the cap, the second collar has the aperture 20 into which fit the cap 17 and the first bearings 18. The first bearing remains sandwiched between the collar and a portion of the first nut as later shown in FIG. 11. To the left of the bearing in the figure, the first nut includes a first O ring 19. The first O ring 19 occupies the corner formed from the inner edge of the second nut and the inside corner of the first nut, also as later shown in FIG. 11. With the cap in place, the first bearings remain in place. With the cap removed, the first bearings can exit the second nut or alternatively be installed into the second nut.

Figure 11:
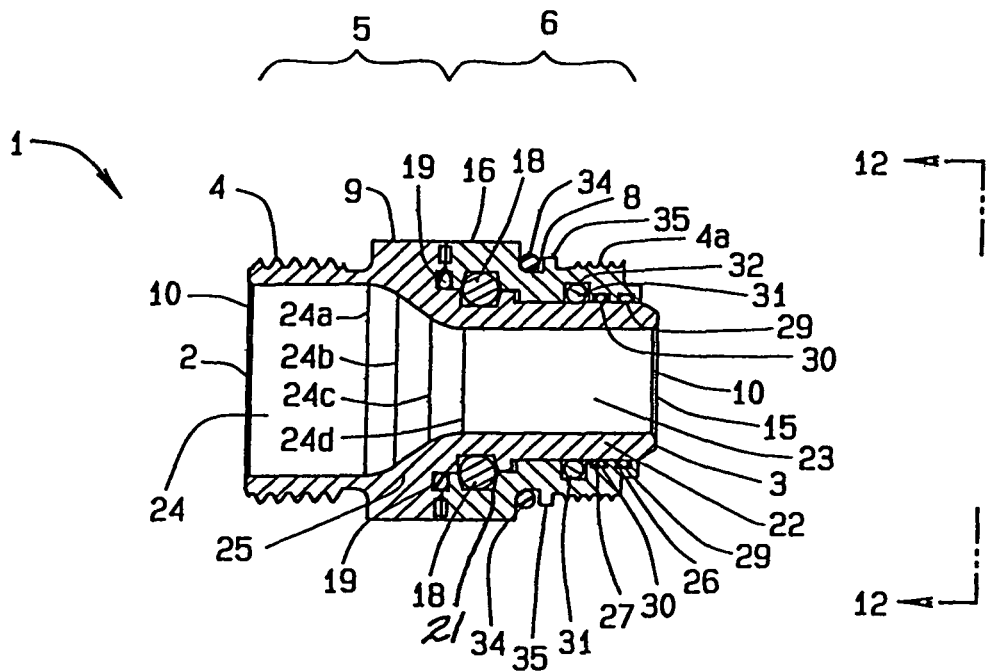
FIG. 11 shows a sectional view of an alternate embodiment of the swivel.

Within its interior, the swivel provides for flow of fluid, mostly fuel, as shown in FIG. 11, a longitudinal section view through the swivel with the first nut connected to the second nut. As above, the first nut 5 has an open end 2 that has external threads 4. The first end includes a slight inward bevel 10 that extends around the circumference of the first end. Inward of the threads, the first nut has the first notch 7 and then the first collar 9. Forward of the collar, the first nut has its neck 22 that fits within the length of the second nut. The neck generally has a slightly lesser diameter than the inner diameter of the second nut. The neck also has a noticeably lesser diameter than the end 2. Opposite the collar 9, the neck has the tip 15, here shown to the far right With a slight bevel to ease assembly. The neck is also a generally hollow cylinder forming a chamber 23 through which fuel flows. The chamber has a narrow diameter within the neck and then a wider diameter proximate the end 2. The chamber has a throat 24 having the widest diameter of the chamber and locating inwardly from the end 2 to approximately where the collar adjoins the first notch. The widest diameter is shown as line 24a. Inward of the widest diameter, the throat curves in a slightly concave manner for a short distance to the second widest diameter, line 24b. From that line, the throat has its diameter decrease in a linear manner going forward to the neck to line 24c, the third widest diameter. Inward of the third diameter, the throat curves in a slightly convex manner for a short distance to attain the inner diameter of the neck as at line 24d. The transition in chamber diameter from the throat 24 to the neck 22 occurs over a portion of the first nut call the constriction 25. The constriction reduces the diameter of the throat by approximately 40% as it transitions to the diameter of the neck. The constriction, being hollow and round like the throat and the neck allows for the passage of fuel through it at the least amount of adverse fluid flow effects. Outwardly from the constriction towards the neck, the neck includes a race 21 of a suitable width to admit the first bearings 18.

And as above, the second nut 6 has its second end 3 here shown to the right, proximate the emplaced tip 15. The second nut continues the hollow shape of the first end through to its opening at the second end 3. The second end also has an inward bevel as at 10. The second end is generally hollow for admission of the neck therein. The second end has its external threads 4a, the second notch 8, and the second collar 16. The second threads have finer pitch than the threads upon the first nut. Inwardly from the second threads opposite the second end, the second nut has the flange 35 upon its circumference. The flange has a generally square cross section as shown and a diameter greater than that of the threads but less than that of the second collar 16. Between the flange and the second collar, the second nut has the second notch 8 that receives the fourth O-ring 34. The fourth O-ring has an outer diameter slightly more than the diameter of the flange 35.

Within the second nut, the second end has the second race 26, the third race 27, and the fourth race 32 mutually spaced apart and concentric. The second race and the third race extend outwardly into the end to admit the second O-ring 29 and the third O-ring 30. The second and third O-rings have an inner diameter slightly smaller than the outer diameter of the neck for a snug fit, preventing fuel leakage. Away from the end and generally inside of the threads, the second nut has the fourth race 32 that extends outwardly into the nut more is than the second and third races. The fourth race admits the second bearings 31 that contact the surface of the neck, allowing rotation of the neck of the first nut relative to the second nut. Then within the collar 16, the second nut also has the race 21 that admits the first bearings 18, once more for rotation of the two components of the invention. Generally, the first bearing 18 has a larger diameter than the second bearing 31. The second collar and the first collar, outwardly from the race 21 and the line 24c respectively, have the first O ring 19 located between the two collars.

The second end opens into the second nut 6 that has the O-ring 34 upon the second notch 8. As shown in this view, the second notch 8 has a larger diameter than the first notch 7, that is, the second notch is shallower than the first notch. The diameter of the second notch and the outer diameter of the O-ring cooperate so that the fourth O-ring remains within the diameter of the flange. In this view, the first end 2 admits fuel into the first stem that flows smoothly through the second nut 6 and out of the second end 3 where the smoothly flowing fuel passes through a chamber 23, generally a hollow cylinder, that extends through both nuts 5, 6 and through the collar 16.

Figure 12:
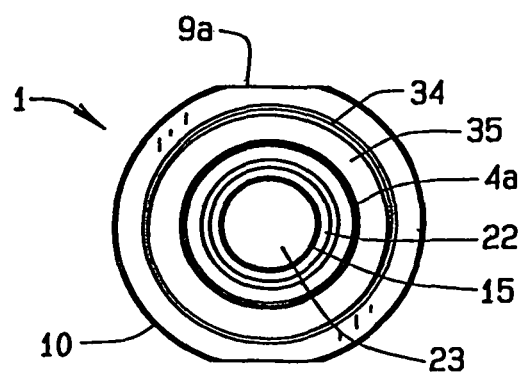
FIG. 12 describes an end view of the swivel.

This alternate embodiment of the inline swivel has a generally round shape when viewed on end in FIG. 12. The inline swivel 1 has its second nut 6 with the second collar 16 that generally defines the maximum diameter, that is, width of the swivel as seen by the motorists after its installation. The collar, generally round, has two spaced apart and mutually parallel faces 9a. The faces allow for a tool, such as a wrench or channel lock pliers, to grip the second nut 6 of the inline swivel. The tool then either turns the second nut into a hose or fitting, or holds the second nut steady as a hose or fitting turns upon either stem. Stepped inwardly from the collar's diameter, the second nut 6 has the fourth O-ring 34 extending slightly outwardly from the flange 35. Inside of the flange, the second nut has its threads, as at 4a, here shown in an end view of the end itself 3. In the center foreground of the figure within the end, the neck 22 extends outwardly from the end, that is, out of the plane of the figure. The tip is generally beveled, as at 10 and as previously shown in FIG. 3. Within the tip, the neck has the chamber 23 through which fuel flows from the first nut through the second nut.

Figure 13:
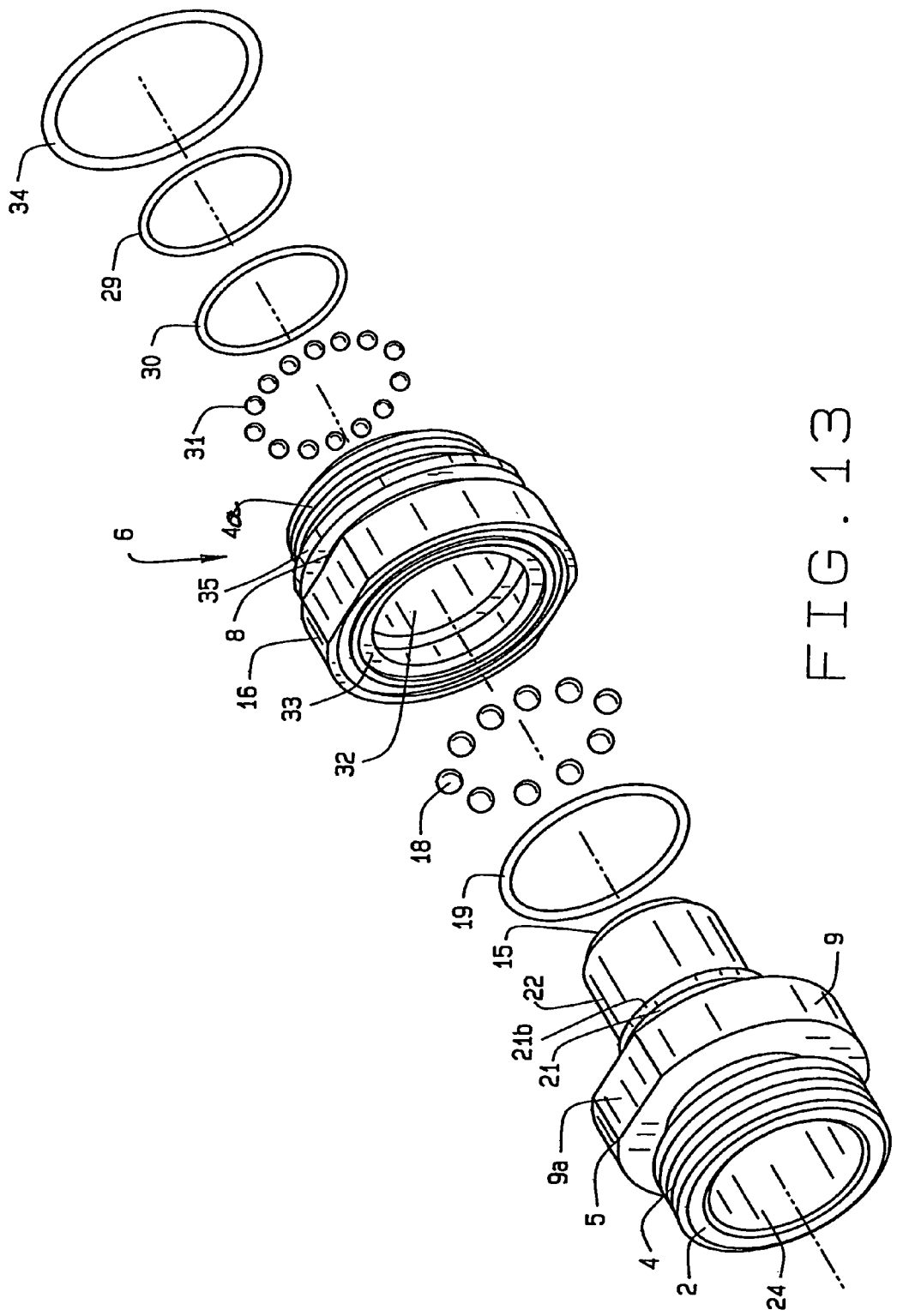
FIG. 13 shows an exploded view of the two nuts of an alternate embodiment of the swivel.

FIG. 13 then shows the alternate embodiment of the inline swivel 1 in an exploded view with the first nut 5 to the left and the second nut 6 to the right. The first nut 5 begins with its throat 24 leading into the nut from the end 2. The end has threads 4 for connecting to other items. The threads continue inwardly to the first notch 7. The threads generally maintain a constant outer diameter for the end while the throat has its constant inner diameter through the threaded portion of the end up to line 24a, as previously shown. Inwardly from the first notch, the first nut 5 expands in width at the first collar 9. The generally round collar 9 has two flat, mutually parallel faces 9a suitable for a tool. The collar has a greater diameter than the threads 4 and generally establishes the maximum width of the swivel. Opposite the threads, the neck 22 extends from the collar further inwardly of the invention. The neck, a generally hollow cylinder has lesser diameter than the threaded end 2. Proximate the collar, the neck has the race 21 that receives the bearings 18. The race has the slight recess into the diameter of the neck, previously shown in FIG. 11, and fits between first step 21a, not shown in this view, and second step 21b. The first step and the second step, mutually spaced apart bands, have a thickness and a diameter exceeding the neck's diameter. The first step and the second step extend around the circumference of the neck and each has a generally square like cross section. The spacing between the first step and the second steps is generally that of the diameter of the first bearings 18. Both the first step and the second step have a position proximate the collar 9 and removed from the tip 15. Inwardly from the race 21, the neck extends to its maximum length shown at the tip 15. The tip has a beveled surface, as at 10, at the terminus of the first nut 5 opposite the end 2. Outwardly from the first nut, this alternate embodiment of the swivel has the first O-ring 19 with an inner diameter that fits snugly upon the first step contiguous with the collar. The first O-ring has a generally round shape and a round cross section. Then outwardly from the first O-ring, the swivel includes a set of first bearings 18, approximately 0.125 inch to approximately 0.3 inch in diameter, preferably 0.1875 inch in diameter. Though this figure shows ten first bearings, the preferred embodiment includes fifteen first bearings generally positioned within the race 21, as previously shown in FIG. 11.

Outwardly from the first bearings 18, this alternate embodiment of the swivel has the second nut 6 with its second collar 16. The second collar, generally round, has two flat faces 9a. Centered within the second collar, a round aperture 32 has a diameter similar to that of the first step 21a. The aperture's diameter admits the neck 22 into the second nut. Inwardly from the aperture, the second collar has a third step 33 that increases the thickness of the second nut proximate the threads. The third step has an inner diameter similar to the outer diameter of the neck 22 and less than the diameter of the second step 21b. Outwardly from the third step and opposite the second collar 16, the second nut 6 has the second notch 8 and the flange 35 inwardly of the interior ending of the threads 4a. As before the notches 7, 8 have a lesser diameter than the threads 4, 4a and the ends 2, 3. The second notch 8, in this alternate embodiment, receives a fourth O-ring 34 around its circumference. This O-ring has a generally round shape with a round cross section. This O-ring has an outer diameter similar to the outer diameter of the flange.

Inwardly from the second step, the second nut continues in a hollow cylindrical manner towards end 3. Proximate the second end 3 and interiorly, the second nut has the fourth race 32, generally of greater diameter than the third step that receives the second bearings 31, and the second race 26 and the third race 27 that receive O-rings 29, 30 as previously shown in FIG. 11. And outwardly from the end 3, the swivel includes second bearings 31, second O-ring 30, and third O-ring 29 shown concentrically and these two O-rings, 29, 30 have a lesser diameter than the fourth O-ring. Though the figure shows fourteen second bearings, the preferred embodiment includes twenty two second bearings 31. The second bearings have a diameter of approximately 0.0625 inch to approximately 0.25 inch. The second and third O-rings have an inner diameter similar to the outer diameter of the neck, a round shape, and a generally round cross section.

Figure 14:
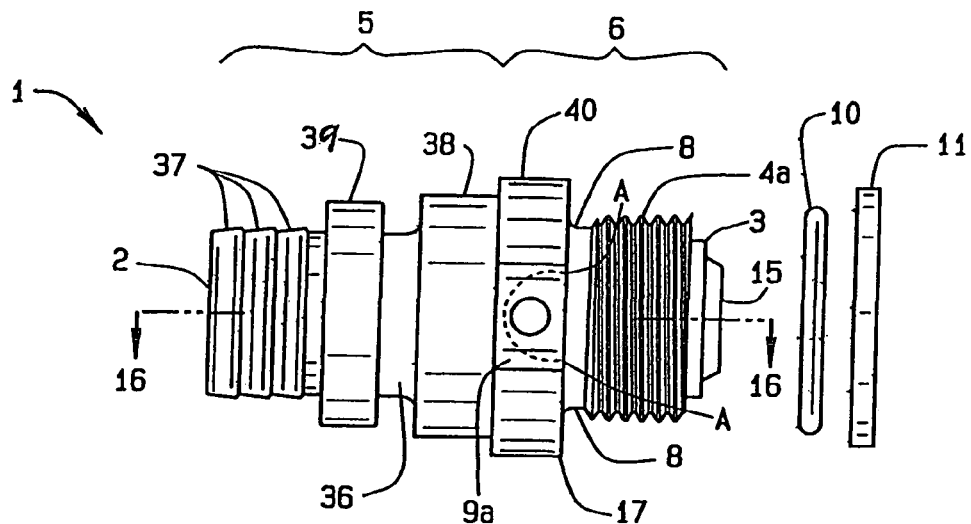
FIG. 14 shows a side view of a second alternate embodiment of the swivel.

The present invention 1 appears in FIG. 14 as a second alternate embodiment. This embodiment also has a generally hollow cylindrical form with a first end 2 and an opposite second end 3. As shown the second end 3 has external threads 4a, here shown as right hand, coarse. The threads continue for approximately four revolutions around the circumference of the second end. The threads extend inwardly upon the second nut 6. However, the first end 2 includes three barbs 37 arranged concentrically and inwardly from the end 2. The barbs have a generally truncated conical shape with the inner and smaller diameter locating towards the end and the outer and wider diameter locating away from the end. The alternate embodiment has three barbs shown however, additional barbs may be provided to match hose diameter and material as needed. The barbs extend along a second neck 36 generally a hollow cylinder of constant diameter. The second neck has approximately the same length as the combined length of the barbs. The second neck extends into the first collar 38. The first collar has a generally round shape of greater diameter than the neck and a thickness less than the length of the neck. The barbs, second neck, and third collar form the first nut 5 of this alternate embodiment.

The first nut and the second nut are hollow and have sufficient length for a solid connection of the swivel to a hose or other fitting. The first nut also has a tip 15 here shown slightly extending from the threads of the second end 3 towards the right of the figure. The tip will be further shown in FIGS. 16, 18. Inwardly, the second nut 6 has a second notch 8 upon its perimeter at the end of the second threads 4a, generally opposite the barbs 37. The second notch 8 has a lesser diameter than the threads 4a and the end 3. Defining one side of each notch and opposite the threads, each nut has a collar. The first nut has a first collar 38 of a diameter noticeably greater than diameter of the barbs 37. The collar has a thickness, along the length of the swivel, suitable for gripping by a tool, such as a wrench or channel lock pliers. The collar extends around the circumference of the swivel, that is, perpendicular to the length of the swivel. The collar is generally round. For further securement of a hose, this swivel includes a short cylindrical clip 39, here shown as a band on edge. The clip has a width much less than the length of the neck 36. The clip is generally round with a diameter exceeding that of the neck 36 and the barbs 37. The second nut has a second collar 40 also of a diameter noticeably greater than diameter of the threads 4a and more than the diameter as the first collar, providing an abutting face for when the first nut inserts into the second nut. This collar 40 also has a thickness, and faces 9a suitable for gripping by a tool, such as a wrench or channel lock pliers. The second collar also includes a cap 17. The cap covers the aperture in the second collar for admission of bearings as later shown in FIG. 15. As an alternate embodiment, the adaptor includes at least one O-ring 10 and at least one gasket 11. The O-ring has a generally O shape as previously shown in FIG. 6 and a rounded cross section. The gasket also has a generally rounded shape as in FIG. 6 but with a squared cross section.

Figure 15:
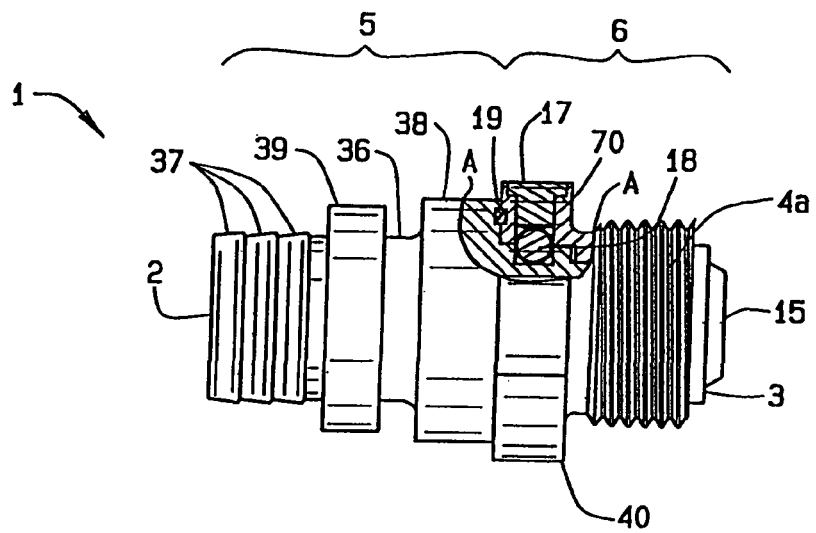
FIG. 15 shows a partial cut away view of a second alternate embodiment of the swivel.

Turning the swivel axially one quarter turn downward from FIG. 14, FIG. 15 shows the second alternate embodiment of the swivel 1 with the faces 9a downwardly and the cap at the lowest portion of the swivel. This figure shows a partial section through the collars 38, 40 more soon the second collar 40 along line A-A. Inwardly from the cap, the second collar has an aperture 70, as later shown in FIG. 18, into which fits the cap 17 and a first bearing 18. The first bearing 18 remains sandwiched between the collar and a portion of the second nut as later shown in FIG. 16. To the left of the bearing in the figure, the second nut includes a first O ring 19. The first O ring 19 occupies the corner formed from the inner edge of the first nut and the inside corner of the second nut, also as later shown in FIG. 18. With the cap in place, the first bearings remain in place. With the cap removed, the first bearings can exit the second nut or alternatively be installed into the second nut.

Figure 16:
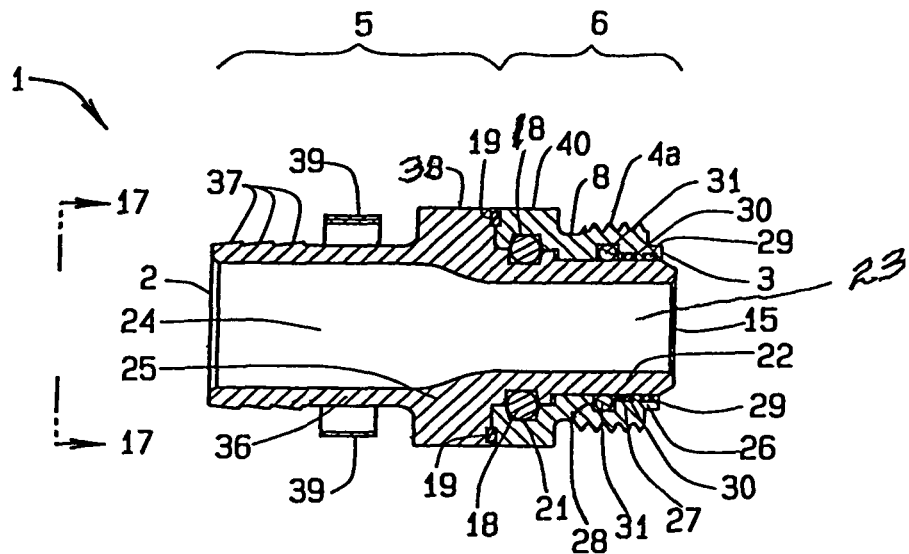
FIG. 16 shows a sectional view of a second alternate embodiment of the swivel.

FIG. 16 provides a longitudinal section view through this alternate is embodiment of the swivel with the first nut inserted into the second nut. As above, the first nut 5 has an open end 2 that has concentric barbs 37. Inward of the threads, the first nut has the neck 36 that receives the clip 39 and then the collar 38. Forward of the collar, the first nut has its neck, as at 22, that fits within the length of the second nut. The neck 22 generally has a slightly lesser diameter than the inner diameter of the second nut. The neck 22 also has a noticeably lesser diameter than the end 2. Opposite the collar 38, the neck 22 has the tip 15, here shown with a slight bevel to ease assembly. The neck, as at 22, is also a generally hollow cylinder forming a chamber 23 through which fuel flows. The chamber has a narrow diameter within the neck and then a wider diameter proximate the end 2. The chamber has a throat 24 having the widest diameter of the chamber and locating inwardly from the end 2 to approximately where the neck 36 joins to the collar 38. The transition in chamber diameter from the throat 24 to the neck 22 occurs over a portion of the first nut call the constriction 25, mostly within the collar 38. The constriction reduces the diameter of the throat by approximately 40% as it transitions to the diameter of the neck. The constriction, being hollow and round like the throat and the neck allows for the passage of fuel through it at the least amount of adverse fluid flow effects. Outwardly from the constriction towards the neck, the neck, as at 22, includes a race 21 of a suitable width to admit the first bearings 18.

And as above, the second nut 6 has its second end 3 here shown to the right, proximate the emplaced tip 15. The second end is generally hollow for admission of the neck 22 therein. The second end has its external threads 4a, the second notch 8, and the collar 40. Within the second nut, the second end has is a second race 26, a third race 27, and a fourth race 28 mutually spaced apart and concentric. The second race and the third race extend outwardly into the end to admit the second O-ring 29 and the third O-ring 30. The second and third O-rings have an inner diameter slightly smaller than the outer diameter of the neck for a snug fit, preventing fuel leakage. Away from the end and generally inside of the threads, the second nut has the fourth race 28 that extends outwardly into the nut more than the second and third races. The fourth race admits the second bearings 31 that contact the surface of the neck, allowing rotation of the neck, as at 22, of the first nut relative to the second nut. Then within the collar 40, the second nut also has the race 21 that admits the first bearings 18, once more for rotation of the two components of the invention. Generally, the first bearing 18 has a larger diameter than the second bearing 31. And outwardly from the race 21, the collars 38, 40, have the first O ring 19 located between them.

Figure 17:
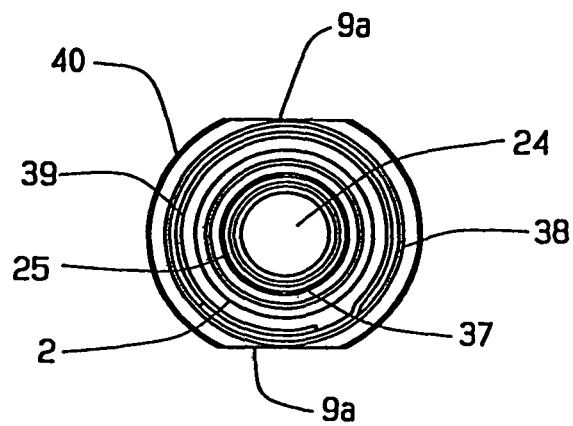
FIG. 17 describes an end view a second alternate embodiment of the swivel.

This alternate embodiment of the inline swivel has a generally round shape when viewed on end in FIG. 17, from end 2. The inline swivel 1 has its collar 40 in the background that generally defines the maximum diameter of this embodiment as seen by the motorists after its installation and the first nut 6 with the collar 38 in the foreground. The collar 40 of the second nut 6, generally round, has two spaced apart and mutually parallel faces 9a. The faces allow for a tool, such as a wrench or channel lock pliers, to grip the second nut 6. The tool then either turns the second nut into a hose or fitting, or holds the second nut steady as a hose or fitting turns upon either nut. Stepped inwardly from the larger collars, 40, diameter, the collar 38 of the first nut 5 receives the clip 39. Within the clip as shown, the first nut has its end 2 with the concentric barbs 37 here showing one on end. Inwardly from the barbs, in the center foreground of the figure within the end, the neck 36 extends outwardly from the end, that is, out of the plane of the figure. The tip is generally beveled as previously shown. Within the tip, the neck has the throat 24 that leads into the constriction 25 and then to the chamber 23 in the background through which fuel flows from the first nut through the second nut.

Figure 18:
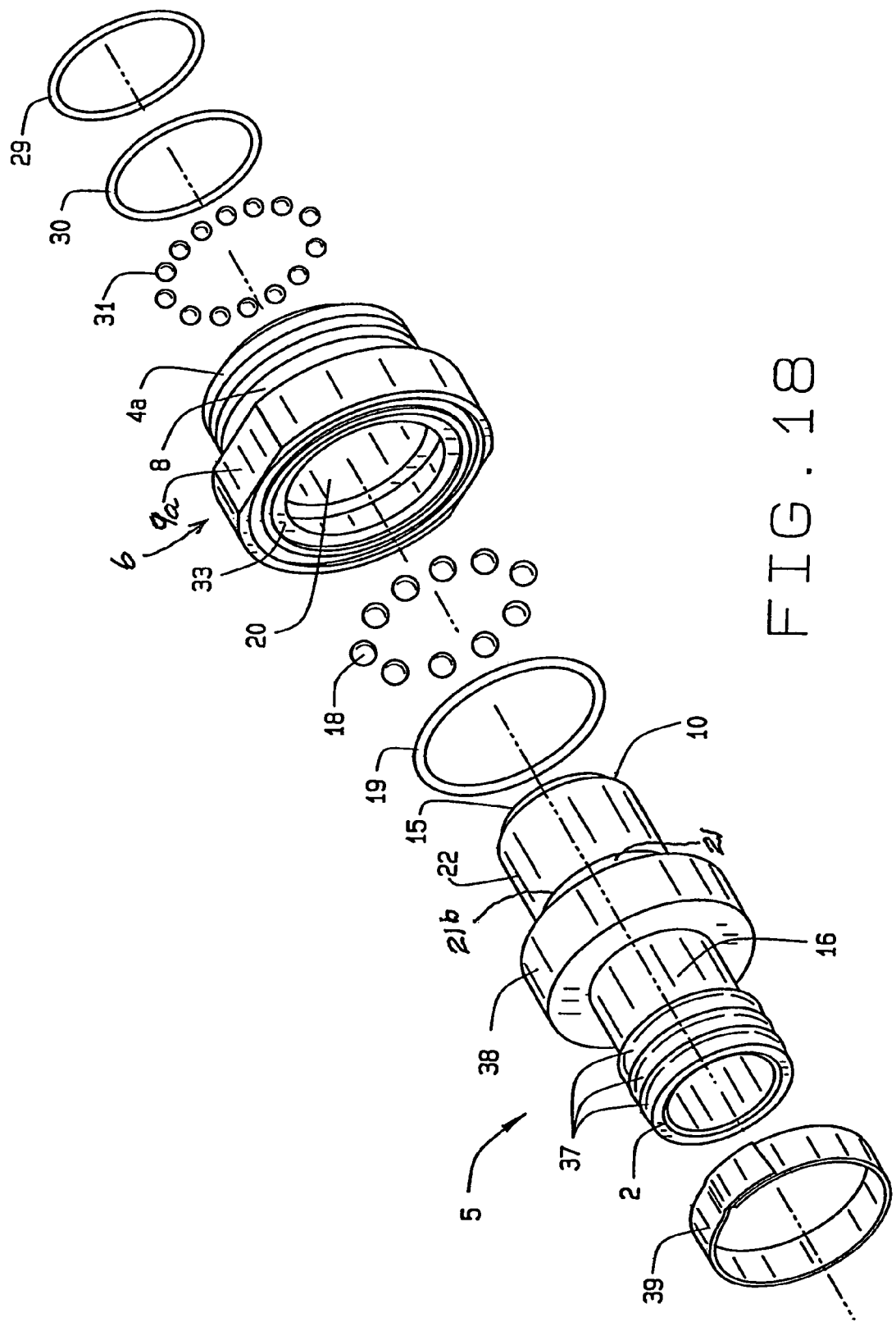
FIG. 18 shows an exploded view of the two nuts of an alternate embodiment of the swivel.

FIG. 18 then shows the alternate embodiment of the inline swivel 1 in an exploded view with the first nut 5 to the left and the second nut 6 to the right. The first nut 5 begins with the clip 39 here shown outwardly from the end 2 and its throat 24 leading into the nut. The end has barbs 37 for receiving a hose that is then crimped upon the neck 16 using the clip. The barbs generally maintain a constant outer diameter for the end while the throat has its constant inner diameter through the threaded portion, as previously shown. Inwardly from the barbs, the first nut continues upon the neck 16 which then joins to the collar 38 of a generally round shape. The collar has a greater diameter than the barbs 37. Away from the barbs and the neck as at 16, the neck 22 extends from the collar further inwardly of the invention. The neck 22, a generally hollow cylinder has lesser diameter than the neck as at 16. Proximate the collar, the neck has the race 21 that receives the bearings 18. The race has a slight recess into the diameter of the neck, previously shown in FIG. 16, and fits between first step 21a, not shown in this view, and second step 21b. The first step and the second step, mutually spaced apart bands, have a thickness and a diameter exceeding the necks as at 22. The first step and the second step extend around the circumference of the neck and each has a generally square like cross section. The spacing between the first step and the second steps is generally that of the diameter of the first bearings 18. Both the first step and the second step have a position proximate the collar 38 and removed from the tip 15. Inwardly from the race 21, the neck 22 extends to its maximum length shown at the tip 15. The tip has a beveled surface, as at 10, at the terminus of the first nut 5 opposite the end 2. Outwardly from the first nut in this view opposite the clip, this alternate embodiment of the swivel has the first O-ring 19 with an inner diameter that fits outwardly from the first step contiguous with the collar 38. The first O-ring has a generally round shape and a round cross section. Then outwardly from the first O-ring, the swivel includes a set of first bearings 18, approximately 0.125 inch to approximately 0.3 inch in diameter, preferably 0.1875 inch in diameter. Though this figure shows ten first bearings, the preferred embodiment includes twelve first bearings generally positioned within the race 21, as previously shown in FIG. 11.

Outwardly from the first bearings 18, this alternate embodiment of the swivel has the second nut 6 with its collar 40. The collar 40, generally round, has two flat faces 9*a*. Centered within the collar, a round aperture 20 has a diameter similar to that of the first step 21*a*. The aperture's diameter admits the neck 22 into the second nut. Inwardly from the aperture, the second collar has a third step 33 that increases the thickness of the second nut proximate the threads. The third step has an inner diameter similar to the outer diameter of the neck 22 and less than the diameter of the second step 21*b*. Outwardly from the third step and opposite the collar 40, the second nut 6 has the second notch 8 inwardly of the interior ending of the threads 4*a*. As before the notch 8 has a lesser diameter than the threads 4*a* and the end 3. The second notch 8, in this alternate embodiment, may receive an O-ring 10 or gasket 11 as needed during installation.

Inwardly from the second step, the second nut continues in a hollow cylindrical manner towards end 3. Proximate the second end 3 and interiorly, the second nut has the fourth race 28, generally of greater diameter than the third step that receives the second bearings 31, and the second race 26 and the third race 27 that receive O-rings 29, 30 as previously shown in FIG. 16. And outwardly from the end 3, the swivel includes second bearings 31, second O-ring 30, and third O-ring 29 shown concentrically. Though the figure shows fourteen second bearings, the preferred embodiment includes seventeen second bearings 31. The second bearings have a diameter of approximately 0.0625 inch to approximately 0.25 inch. The second and third O-rings have an inner diameter similar to the outer diameter of the neck, a round shape, and a generally round cross section.

From the aforementioned description, an inline swivel has been described. This swivel is uniquely capable of connecting two female openings simultaneously for hoses, fittings, and combinations thereof. This swivel also has cooperating collars locating proximate the center that allows rotation of the entire swivel as needed during its installation. The collars also allow for gripping by a wrench or other tool. Though the swivel and other components are shown and described with round cross-sections, other cross-sections are possible in alternate embodiments. This swivel and its various components may be manufactured from many materials including but not limited to polymers, low density polyethylene, high density polyethylene, polypropylene, nylon, ferrous and non-ferrous metals, their alloys, and composites.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, is set forth for illustrative purposes only.

I claim:

1. An inline swivel connecting a hose, a fitting, a nozzle or other attachment for fuel dispensing, comprising:

a first nut and an axially aligned second nut, said first nut and said second nut having a generally hollow cylindrical shape, said first nut and said second nut mutually rotating about a common longitudinal axis;

a collar positioned upon an integral of said first nut and having at least two flat faces adapted to receive a tool;

a second collar positioned upon an integral of said second nut and having at least two flat faces adapted to receive a tool, at least one of said flat faces having an aperture for receiving at least one ball bearing therein;

a chamber longitudinally extending within said first nut, said collar, said second collar, and said first nut, said chamber adapted to pass fluid without is leakage therethrough;

the first nut having a first end and external threads between said first end and said collar;

the second nut having a second end and external threads between the second end and the second collar;

said external threads of said first and second nuts extending axially in opposite directions;

said collar having two spaced apart and mutually parallel faces, said faces being generally parallel to the length of said swivel, said collar being round away from said faces;

said second collar having two spaced apart and mutually parallel faces, said faces being generally parallel to the length of said swivel, said second collar being round away from said faces, one of said faces having said aperture therein and a cap upon said aperture; and said aperture formed in the second collar adjacent the first race, the aperture for receiving the bearing for insertion or removal from the first race, and a cap for covering the aperture.

2. The inline swivel of claim 1 further comprising a first race formed between the first nut and the second nut, the first race for receiving a bearing.

3. The inline swivel of claim 1 further comprising a second race formed in the second nut, the second race for receiving a second bearing.

4. The inline swivel of claim 3 wherein the bearing has a first diameter and the second bearing has a second diameter and the first diameter is greater than the second diameter.

5. The inline swivel of claim 1 further comprising a second race formed in the second nut, a first O-ring for positioning in the second race, a third race formed in the second nut, and a second O-ring for positioning in the third race.

6. The inline swivel of claim 1 wherein the first nut further comprises a neck that extends through and out of the second nut.

7. The inline swivel of claim 1 wherein the first end of said first nut and the second end of said second nut are each beveled ends outwardly from said collar and said second collar generally leading into said chamber.

\* \* \* \* \*